United States Patent
O'Donnell

(10) Patent No.: US 7,500,178 B1
(45) Date of Patent: Mar. 3, 2009

(54) TECHNIQUES FOR PROCESSING ELECTRONIC FORMS

(75) Inventor: Shawn O'Donnell, Honolulu, HI (US)

(73) Assignee: AGIS Network, Inc., St. Louis, MO (US)

(*) Notice: Subject to any disclaimer, the term of this patent is extended or adjusted under 35 U.S.C. 154(b) by 0 days.

(21) Appl. No.: 10/660,950

(22) Filed: Sep. 11, 2003

(51) Int. Cl.
*G06F 17/00* (2006.01)
*G06F 17/30* (2006.01)

(52) U.S. Cl. ............... 715/221; 715/222; 715/226; 707/10

(58) Field of Classification Search .......... 715/505, 715/506, 507, 200, 221–224, 231, 234, 253, 715/255, 256, 273; 707/10, 1, 100, 204
See application file for complete search history.

(56) References Cited

U.S. PATENT DOCUMENTS

| | | | |
|---|---|---|---|
| 5,367,619 A * | 11/1994 | Dipaolo et al. ............ 715/506 |
| 5,867,821 A | 2/1999 | Ballantyne et al. |
| 5,946,691 A * | 8/1999 | Lee et al. .................. 707/100 |
| 6,199,079 B1 | 3/2001 | Gupta et al. |
| 6,208,339 B1 * | 3/2001 | Atlas et al. ............... 715/507 |
| 6,247,029 B1 * | 6/2001 | Kelley et al. ............. 715/507 |
| 6,460,042 B1 * | 10/2002 | Hitchcock et al. ......... 707/10 |
| 6,490,601 B1 * | 12/2002 | Markus et al. ............ 715/507 |
| 6,493,721 B1 * | 12/2002 | Getchius et al. ......... 707/104.1 |
| 6,499,042 B1 * | 12/2002 | Markus ..................... 715/507 |
| 6,589,290 B1 * | 7/2003 | Maxwell et al. .......... 715/507 |
| 6,662,340 B2 | 12/2003 | Rawat et al. |
| 6,701,486 B1 * | 3/2004 | Weber et al. ............. 715/209 |
| 6,981,028 B1 * | 12/2005 | Rawat et al. ............. 709/217 |
| 7,206,998 B2 * | 4/2007 | Pennell et al. ............ 715/224 |
| 2002/0013788 A1 * | 1/2002 | Pennell et al. ............ 707/507 |
| 2002/0023108 A1 * | 2/2002 | Daswani et al. ........... 707/507 |
| 2002/0083068 A1 | 6/2002 | Quass et al. |
| 2002/0156846 A1 * | 10/2002 | Rawat et al. ............. 709/203 |
| 2002/0165877 A1 * | 11/2002 | Malcolm et al. .......... 707/507 |
| 2003/0074277 A1 | 4/2003 | Foutz |
| 2003/0120652 A1 | 6/2003 | Tifft |
| 2003/0171964 A1 * | 9/2003 | Center et al. ............... 705/8 |
| 2004/0044951 A1 | 3/2004 | Repko et al. |
| 2004/0064692 A1 | 4/2004 | Kahn et al. |
| 2004/0093323 A1 | 5/2004 | Bluhm et al. |

(Continued)

FOREIGN PATENT DOCUMENTS

EP              451485        * 10/1991

(Continued)

OTHER PUBLICATIONS

Chusho et al., "Automatic filling in a Form by an Agent for Web Applications", IEEE Computer Society, pp. 1-9, Dec. 2002.*

(Continued)

*Primary Examiner*—Doug Hutton
*Assistant Examiner*—Maikhanh Nguyen
(74) *Attorney, Agent, or Firm*—Townsend and Townsend and Crew LLP

(57) ABSTRACT

Embodiments of the present invention provide techniques for processing electronic forms. Techniques are provided for automatically filling out fields of electronic forms for a user based upon information stored for the user. This reduces the amount of information that a user has to enter on an electronic form.

6 Claims, 13 Drawing Sheets

U.S. PATENT DOCUMENTS

2006/0200754 A1     9/2006    Kablesh et al.

FOREIGN PATENT DOCUMENTS

| EP | 843266 | * | 5/1998 |
|----|--------|---|--------|
| EP | 0843266 A1 | * | 5/1998 |
| EP | 0918424 A2 | * | 5/1999 |
| WO | WO 98/43181 | * | 10/1998 |
| WO | WO 99/46701 | * | 9/1999 |
| WO | WO 03/030017 A2 | * | 4/2003 |

OTHER PUBLICATIONS

Hallam-Baker, Phillip M. " Client Side Autmotated Form Entry", W3C Working Draft WD-form-filling, Apr. 16, 1996, available at <"http://www.w3.org/TR/WD-form-filling.html">.*

D. Dejean, "High-powered FormFlow automates paper traffic", PC Maganize, vol. 12, No. 18, pp. 1-3, Oct. 26, 1993.*

J. Powell, "Informs—WordPerfect Joins the Forms Race", Windows Maganize, No. 404,pp. 1-14, 1993.*

P. Maret et al., "Multimedia Information Interchange: Web Forms Meet Data Servers", IEEE, vol. 2, 1999, pp. 499-505.*

Adobe Designer 6.0 Datasheet: The Premier Development Tool for Creating Intelligent Documents, © 2004 Adobe Systems Incorporated, pp. 1-2.

JetForm Design: Graphical Development Tool for E-form Creation and Automation, © 1998, JetForm Corporation, pp. 1-2.

JetForm Press Release: "JetForm® Announces First Comprehensive XML Forms Definition to Speed E-Commerce Adoption," Ottawa, Jun. 28, 1999, 4 pages, (printed from http://xml.coverpages.org/jetform-prir990628.html.

Oracle9i Forms, printed from http://www.oracle.com/technology/products/forms/htdocs/9iform_fov.htm, on Mar. 28, 2006, 8 pages.

* cited by examiner

TECHNIQUES FOR PROCESSING ELECTRONIC FORMS

CROSS-REFERENCES TO RELATED APPLICATIONS

This application incorporates by reference for all purposes the entire contents of U.S. patent application Ser. No. 10/660,951 filed concurrently with the present application.

BACKGROUND OF THE INVENTION

The present invention relates to services provided in an online environment and more particularly to techniques for processing electronic forms.

The popularity of communication networks, such as the Internet and the World Wide Web (WWW), and the growing proliferation of computing devices has completely revolutionized the manner in which products and/or services are advertised, sold, and purchased. Most providers of products and services nowadays offer websites that advertise and sell the products and/or services. The Internet has thus become an important channel for providers to reach out to a large consumer audience in an easy and cost-efficient manner.

The Internet has also provided several conveniences to consumers. For example, information that would otherwise be difficult to find is now just a mouse-click away from the consumer. Consumers can browse and purchase products and/or services from the comfort of their homes or offices. The conveniences offered by the Internet have especially benefited the elderly and the disabled or others whose locomotive skills are hampered.

Although networks such as the Internet offer several advantages and benefits, the use of such networks is not always easy and streamlined. For example, in order to purchase a particular product, a consumer generally has to first identify a provider that sells the particular product. In order to identify the appropriate provider, the consumer typically has to perform several searches and then select a provider from the search results. The consumer then has to visit the selected provider's website and browse their products/services catalog to identify the particular product that the consumer is interested in purchasing. The consumer then has to fill out several forms (e.g., purchase forms, credit card information forms, etc.) provided by the provider before the particular product can be purchased. A common complaint of online consumers is that when they fill-in forms from different providers, they have to reenter the information requested by the form. This can be quite tedious and time consuming. This is especially rampant in the healthcare industry, which often requires submission of several forms and resubmission of forms at periodic intervals in order to continue services.

While the tasks to participate in online activities may be performed easily by individuals who are computer-savvy, they can be very tedious, intimidating, and frustrating for individuals who are not computer savvy. For example, a large number of the elderly and disabled find it difficult to perform these tasks and thus cannot avail themselves of the benefits offered by networks such as the Internet.

BRIEF SUMMARY OF THE INVENTION

Embodiments of the present invention provide techniques for processing electronic forms. Techniques are provided for automatically filling out fields of electronic forms for a user based upon information stored for the user. This reduces the amount of information that a user has to enter on an electronic form.

According to an embodiment of the present invention, techniques are provided for processing electronic forms. In this embodiment, information identifying a first electronic form is received. A set of descriptors associated with a set of fields included in the first electronic form is then determined, the set of descriptors including a first descriptor associated with a first field. User information is accessed comprising information identifying a set of identifiers stored for a user, the set of identifiers stored for the user including a first identifier corresponding to the first descriptor, wherein a first value is associated with the first identifier. The first electronic form is displayed on a computer display such that the first value is displayed in the first field of the first electronic form. At least a second descriptor associated with a field in the first electronic form is associated that does not have a corresponding identifier in the set of identifiers stored for the user. A second value entered in the field associated with the second descriptor is determined. An identifier corresponding to the second descriptor is included in the set of identifiers stored for the user, wherein the second value is associated with the identifier corresponding to the second descriptor.

According to another embodiment of the present invention, techniques are provided for processing electronic forms. In this embodiment, a first electronic form is displayed, the first electronic form comprising at least a first field, wherein a first descriptor is associated with the first field. First information entered in the first field on the first electronic form is determined. Information is stored for a user indicating that the first information was entered in a field associated with the first descriptor.

The foregoing, together with other features, embodiments, and advantages of the present invention, will become more apparent when referring to the following specification, claims, and accompanying drawings.

BRIEF DESCRIPTION OF THE DRAWINGS

FIG. 11 depicts another simplified GUI displaying information related to E-forms according to an embodiment of the present invention.

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
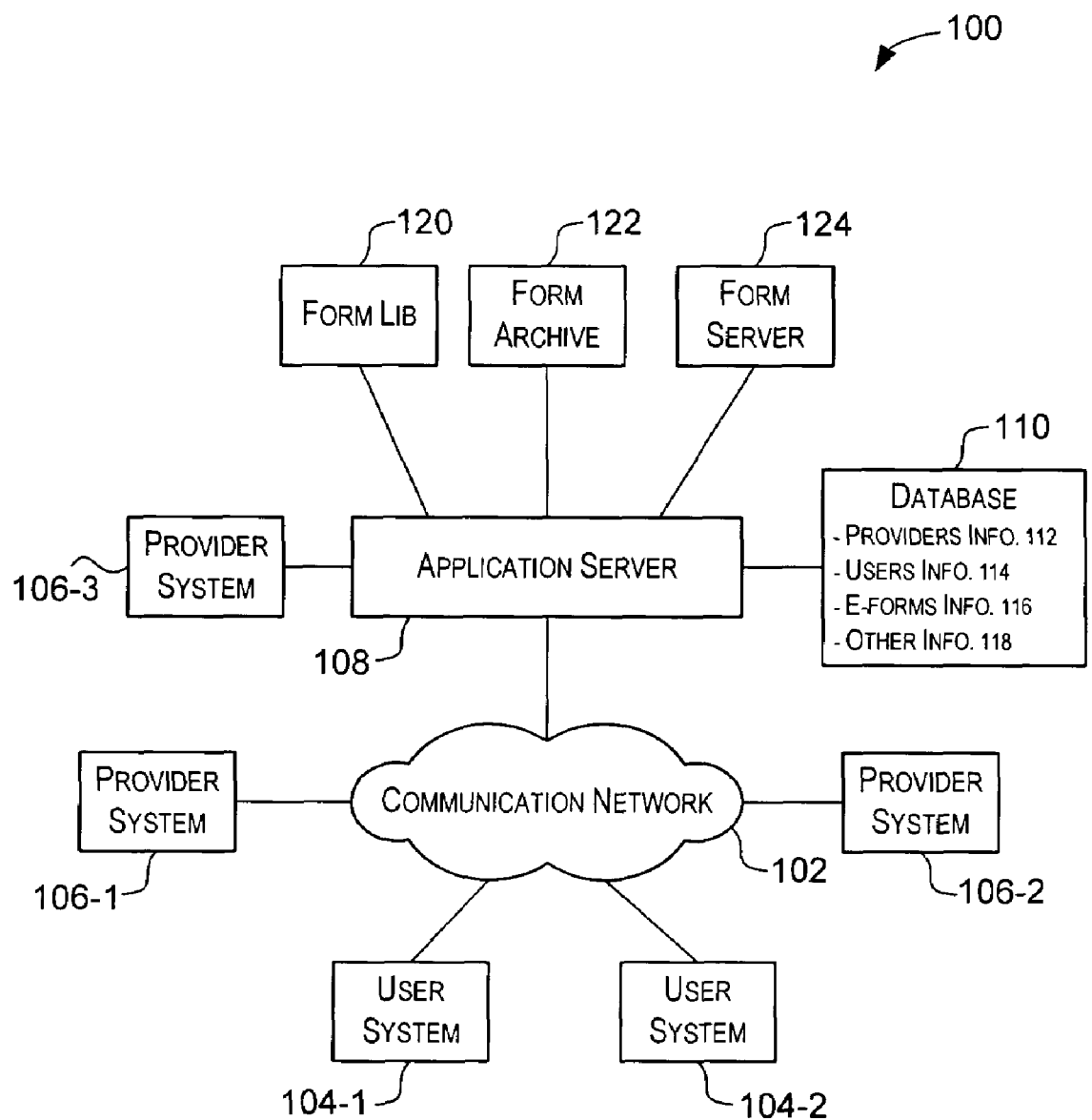
FIG. 1 is a simplified block diagram of a network environment that may incorporate an embodiment of the present invention.

FIG. 1 is a simplified block diagram of a network environment 100 that may incorporate an embodiment of the present invention. Network environment 100 depicted in FIG. 1 is merely illustrative of an embodiment incorporating the present invention and does not limit the scope of the invention as recited in the claims. One of ordinary skill in the art would recognize other variations, modifications, and alternatives.

As depicted in FIG. 1, network 100 comprises a number of computer systems coupled to a communication network 102. The computer systems include user systems 104, provider systems 106, and an application server 108. Communication network 102 provides a mechanism for allowing communication between the various computer systems. Communication network 102 may be a local area network (LAN), a wide area network (WAN), a wireless network, an Intranet, the Internet, a private network, a public network, a switched network, or any other suitable communication network. Communication network 102 may comprise many interconnected computer systems and communication links. The communication links may be hardwire links, optical links, satellite or other wireless communications links, wave propagation links, or any other mechanisms for communication of information. Various communication protocols may be used to facilitate communication of information via the communication links, including TCP/IP, HTTP protocols, extensible markup language (XML), wireless application protocol (WAP), protocols under development by industry standard organizations, vendor-specific protocols, customized protocols, and others.

Application server 108 is configured to provide services for providers of products and/or services and also for users or consumers. According to an embodiment of the present invention, application server 108 enables providers to advertise and sell products and services to users. Systems 106 of the providers may be coupled to application server 108 either directly via communication links (e.g., provider system 106-3 depicted in FIG. 1) or indirectly via communication network 102 (such as systems 106-1 and 106-2 depicted in FIG. 1). Providers may include private providers, public providers, individuals, entities of various kinds, and even government entities. The term "provider" is intended to include any entity that provides products, services, or information that can be used by users.

For the users, application server 108 provides a seamless information gateway through which users can identify, learn about, browse, and even interact with resources available from the providers. Application server 108 thus offers an online forum for electronic information exchange between providers and users, the ability to enter into transactions, provides features for tracking performance of services, the ability to perform data analysis, and other associated tasks. Application server 108 may itself be a provider of services, products, and information for the users.

In one embodiment, application server 108 provides a portal or online community for users and providers. For example, application server 108 may provide a portal or online community providing access to web-based services offered by providers for seniors, persons with disabilities, and other with long term care needs. Application server 108 may a web-based Single Entry Point (SEP) system for individuals with such needs. In this embodiment, application server 108 may provide a website that provides users access to services, products, and information offered by various providers. A user can log into the website to gain access to the products, services, or information. Application server 108 thus provides a convenient mechanism that enables the elderly and the disabled to more easily avail themselves of the resources offered by the providers. In addition to providing access to services and products offered by the providers, application server 108 also provides several services to simplify a user's online experience. For example, as described below in further detail, application server 108 may provide facilities for processing online forms, navigating forms, entering information in forms, submitting forms, archiving forms information, tracking forms information, etc.

As shown in FIG. 1, application server 108 may be coupled to database 110. Database 110 provides a repository for storing information that may be used by application server 108 for providing and facilitating services and benefits offered by application server 108. Database 110 may be of various types including a relational database (e.g., SQLServer 2000), a data or memory structure, and the like. The information stored in database 110 may include providers information 112, users information 114, electronic forms information 116, and other information 118.

Providers information 112 may include information related to providers including information identifying the providers, information related to products and/or services offered by the providers, contact information for the providers, information related to electronic forms ("E-forms") of the providers, and other information related to the providers.

Users information 114 may include information related to users of application server 108. This information may include information identifying the users, user profiles, user preferences, forms information stored for the users, and other user related information. A separate account may be maintained for each user. The forms information associated with a user may include information related to electronic forms filled and submitted by the user, status of forms submitted by the user, information used for automatically populating the forms, and the like.

Forms information 116 may include information used by application server 108 to facilitate processing of electronic forms according to the teachings of the present invention. This information may include templates and images for the E-forms, information identifying descriptors (e.g., field names associated with fields) for fields in the forms, information related to different versions of E-forms, and other information. Application server 108 may use this information to render or display the E-forms to the users.

In certain embodiments, the information representing E-forms such as templates, images, and other information, may also be stored in a form library 120 and may be used by application server 108 to display E-forms. The data contents of E-forms provided by users may be stored in a form archive 122.

As described above, application server 108 may provide an online community where providers and users can exchange information. In such an embodiment, other information 118 may include information related to articles that are available for reading by users and providers, information identifying links to providers, forum and chat messages, Frequently Asked Questions (FAQs) related to the offered services, information related to government rules and regulation, and other like information.

Application server 108 may also use services provided by form server 124. Form server 124 may be configured to carry-out reusable functions for manipulation of E-forms such as XML data merging, and other functions. An example of form server 124 is the Adobe Form Server provided by Adobe Systems, Inc. of San Jose, Calif.

Users can interface with application server 108 and use services offered by application server 108 using user systems 104. User system 104 may be any device or computer platform (e.g., a personal computer) that can access communication network 102 and interface with application server 108. Various different interfaces may be used for communicating with application server 108 including hardware and software interfaces capable of interpreting communication protocols such as HyperText Markup Language (HTML) protocol, Secure Sockets Layer (SSL) protocol, File Transfer Protocol (FTP), Extensible Markup Language (XML) protocol, WAP, and others. For example, users may interface with application server 108 using a browser (e.g., Microsoft Internet Explorer, Netscape Navigator, etc.) executing on user system 104. A user using the browser may connect to a website offered by application server 108.

Figure 2:
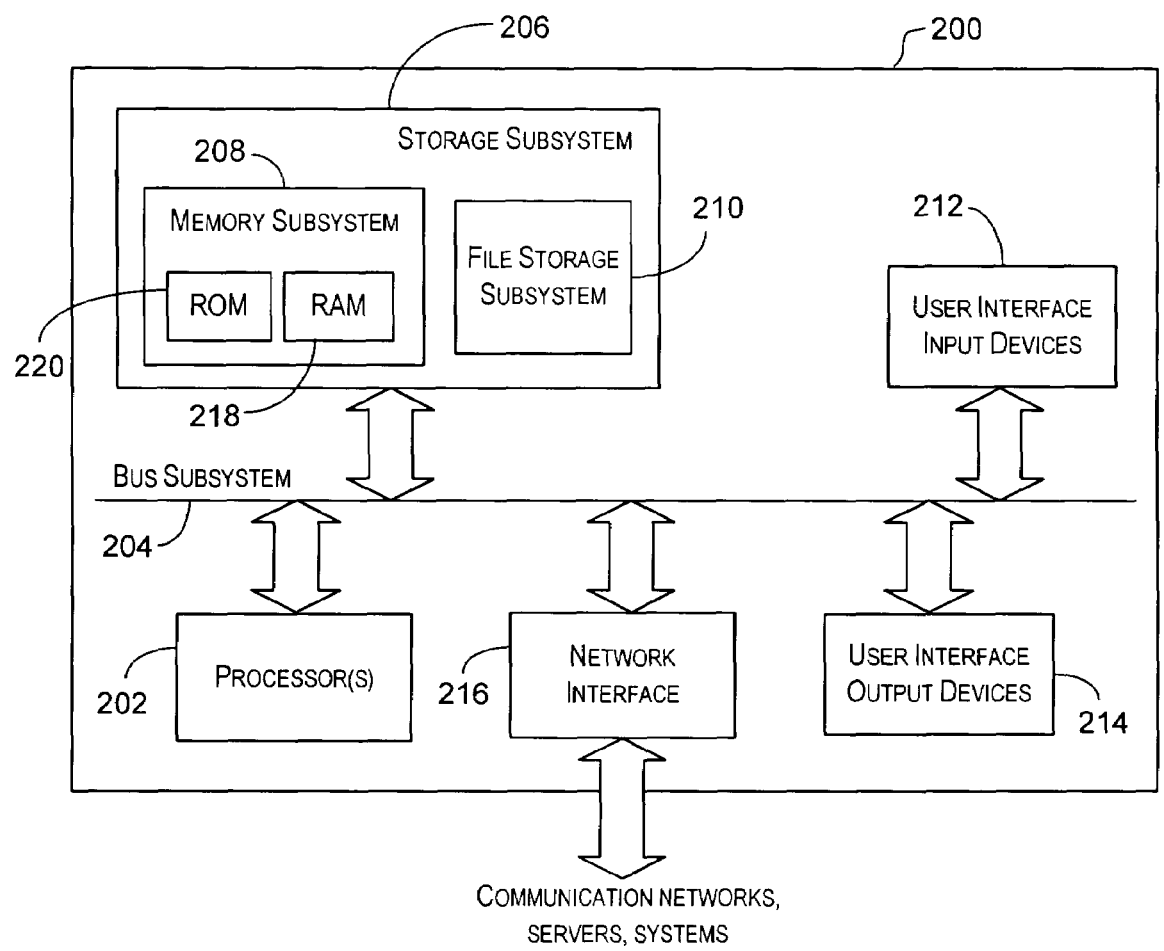
FIG. 2 is a simplified block diagram of computer system according to an embodiment of the present invention.

FIG. 2 is a simplified block diagram of computer system 200 according to an embodiment of the present invention. For example, computer system 200 may be used as a user system, provider system, or an application server system. As shown in FIG. 2, computer system 200 includes a processor 202 that communicates with a number of peripheral devices via a bus subsystem 204. These peripheral devices may include a storage subsystem 206, comprising a memory subsystem 208 and a file storage subsystem 210, user interface input devices 212, user interface output devices 214, and a network interface subsystem 216. The input and output devices allow a user, such as the administrator, to interact with computer system 200.

Network interface subsystem 216 provides an interface to other computer systems, networks, servers, and systems. Network interface subsystem 216 serves as an interface for receiving data from other sources and for transmitting data to other sources from computer system 200. Embodiments of network interface subsystem 216 include an Ethernet card, a modem (telephone, satellite, cable, ISDN, etc.), (asynchronous) digital subscriber line (DSL) units, and the like.

User interface input devices 212 may include a keyboard, pointing devices such as a mouse, trackball, touchpad, or graphics tablet, a scanner, a barcode scanner, a touchscreen incorporated into the display, audio input devices such as voice recognition systems, microphones, assistive technology input devices, and other types of input devices. In general, use of the term "input device" is intended to include all possible types of devices and mechanisms for inputting information to computer system 200.

User interface output devices 214 may include a display subsystem, a printer, a fax machine, assistive technology output devices, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 200.

Storage subsystem 206 provides a repository for storing information. For example, storage subsystem 206 may be configured to store the basic programming and data constructs that provide the functionality of the present invention. According to an embodiment of the present invention, software code modules implementing the functionality of the present invention may be stored in storage subsystem 206. These software modules may be executed by processor(s) 202. Storage subsystem 206 may also provide a repository for storing data used in accordance with the present invention. For example, forms information, users information, etc. may be stored in storage subsystem 206. Storage subsystem 206 may comprise memory subsystem 208 and file/disk storage subsystem 210.

Memory subsystem 208 may include a number of memories including a main random access memory (RAM) 218 for storage of instructions and data during program execution and a read only memory (ROM) 220 in which fixed instructions are stored. File storage subsystem 210 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 204 provides a mechanism for letting the various components and subsystems of computer system 200 communicate with each other as intended. Although bus subsystem 204 is shown schematically as a single bus, alternative embodiments of the bus subsystem may utilize multiple busses.

Computer system 200 can be of various types including a personal computer, a portable computer, a workstation, a network computer, a mainframe, a kiosk, a PDA, a cell phone, or any other data processing system. Due to the ever-changing nature of computers and networks, the description of computer system 200 depicted in FIG. 2 is intended only as a specific example for purposes of illustrating the preferred embodiment of the computer system. Many other configurations having more or fewer components than the system depicted in FIG. 2 are possible.

As previously stated, users generally have to fill out electronic forms provided by the providers to purchase products and services from the providers. An electronic form (or E-form) is generally a rendering of text, lines, images, and other objects assembled on a computer screen to resemble paper forms commonly used in business, government, and other environments.

Figure 3:
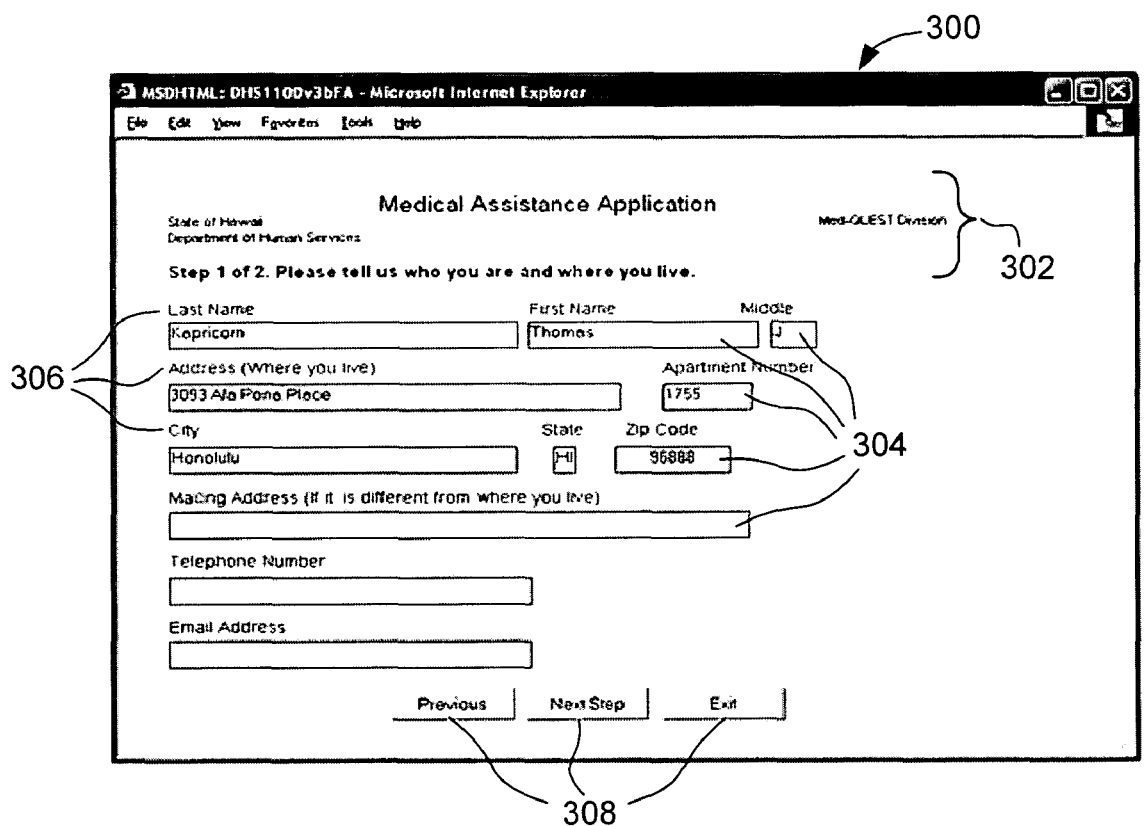
FIG. 3 depicts an example of a simplified E-form according to an embodiment of the present invention.

FIG. 3 depicts an example of an E-form 300 according to an embodiment of the present invention. As depicted in FIG. 3, E-form 300 comprises text 302, fields 304, field labels 306, and other objects such as buttons 308. Different types of text may be printed on an E-form. For example, in FIG. 3, text 302 identifies the form name ("Medical Assistance Application"), the name of the provider (State of Hawaii, Department of Human Services, Med-QUEST Division) and the entity to which the form will be submitted, instructions for filling out the E-form, and other information. Several fields 304 are provided on E-form 300. A user may enter information or values in the fields. A field label 306 is printed next to each field describing the type of information to be entered into the field. Buttons 308 allow the user to navigate through the forms. A button (not shown) may also be provided for submitting the E-form to a provider.

When an E-form is created, a descriptor is usually associated with each field on the E-form. For example, a field name may be associated with each field on an E-form. The field name associated with a field may identify the semantics of the information entered in the field. For example, in FIG. 3, a field name of "LAST_NAME" may be associated with the field displayed below label "Last Name", a field name "FIRST- _NAME" may be associated with the field displayed below label "First Name", and the like. Various other types of descriptors, besides field names, may also be associated with fields of an E-form.

A field name is different from a field label that is printed proximal to a field and displayed to the user. Two fields on two separate forms (or even on the same form) in which the user enters his/her last name may have two different labels (e.g., "Last Name" on one E-form and "Your Last Name" on the other E-form), but may have the same field name (e.g., field name "LAST_NAME") associated with them.

Application server 108 provides services for processing E-forms including selecting electronic forms, navigating forms, entering information in forms, submitting forms, archiving forms information, tracking forms information, etc. According to an embodiment of the present invention, the processing performed for providing these services may be divided into three areas: (1) processing performed to activate an E-form for use by a user; (2) processing performed for rendering or displaying an E-form to a user; and (3) processing performed responsive to receiving a signal indicating that a user wants to submit an E-form to a provider and/or wants to archive the E-form information. Each of these processing areas is described below in further detail.

Processing Performed to Activate an E-Form

An E-form may be created by a form designer. Various tools and software packages may be used to create E-forms. For example, a provider may create an E-form using software executing on a provider system 106. Application server 108 may also provide tools that can be used to create E-forms. An example of an E-form creation tool is Adobe Form Designer provided by Adobe Systems, Inc. It should be apparent that various other commercially available tools and software packages may also be used to design and create E-forms.

Creating an E-form generally comprises defining objects (e.g., lines, text, fields, etc.) that are to be displayed in the E-form and their layout (e.g., the size of the displayed objects, the locations of the objects, etc.). Attributes and types may also be configured for the form objects. During form creation, the form designer may associate field descriptors such as field names with each of the fields on an E-form. Different conventions may be used for choosing the field names. A field name associated with a field may be chosen such that is describes the semantics of the information entered in the field. The same field name may be associated with different fields (on the same form or different forms) that act as placeholders for a particular type of information. For example, a field name "LAST_NAME" may be associated with all fields (in one E-form or different E-forms) in which the user enters the user's last name. As another example, a field name "FIRST_NAME" may be associated with all fields (in one E-form or different E-forms) in which the user enters the user's first name. Fields that are not meant to store a persistent piece of information (e.g., name, address, etc.) but are meant to be placeholders for a calculation, derivation, etc. may be associated with field name starting with "TMP_" to indicate that the field is a placeholder for a temporary value. Names may also be associated with other objects included in an E-form. For example, names may be associated with buttons displayed on an E-form, with text displayed on an E-form, and the like.

An E-form may be stored in the form of a template file and images associated with the E-form. The template file may store the layout for the E-form. In one embodiment, the template file defines objects comprising the E-form and object attributes such as position, size, text values, etc. Images may comprise the static background elements of E-forms such as graphics, lines, and static text. After the design of an E-form has been completed, the E-form information (e.g., the template file for the E-form and the associated images) may be forwarded to application server 108 for activation and use by users. The E-form templates and images may be stored in form library 120 (or in database 110 depicted in FIG. 1) and the data contents (e.g., stored as an XML structure) of E-forms saved by users may be stored in form archive 122 (or in database 110 depicted in FIG. 1).

Figure 4:
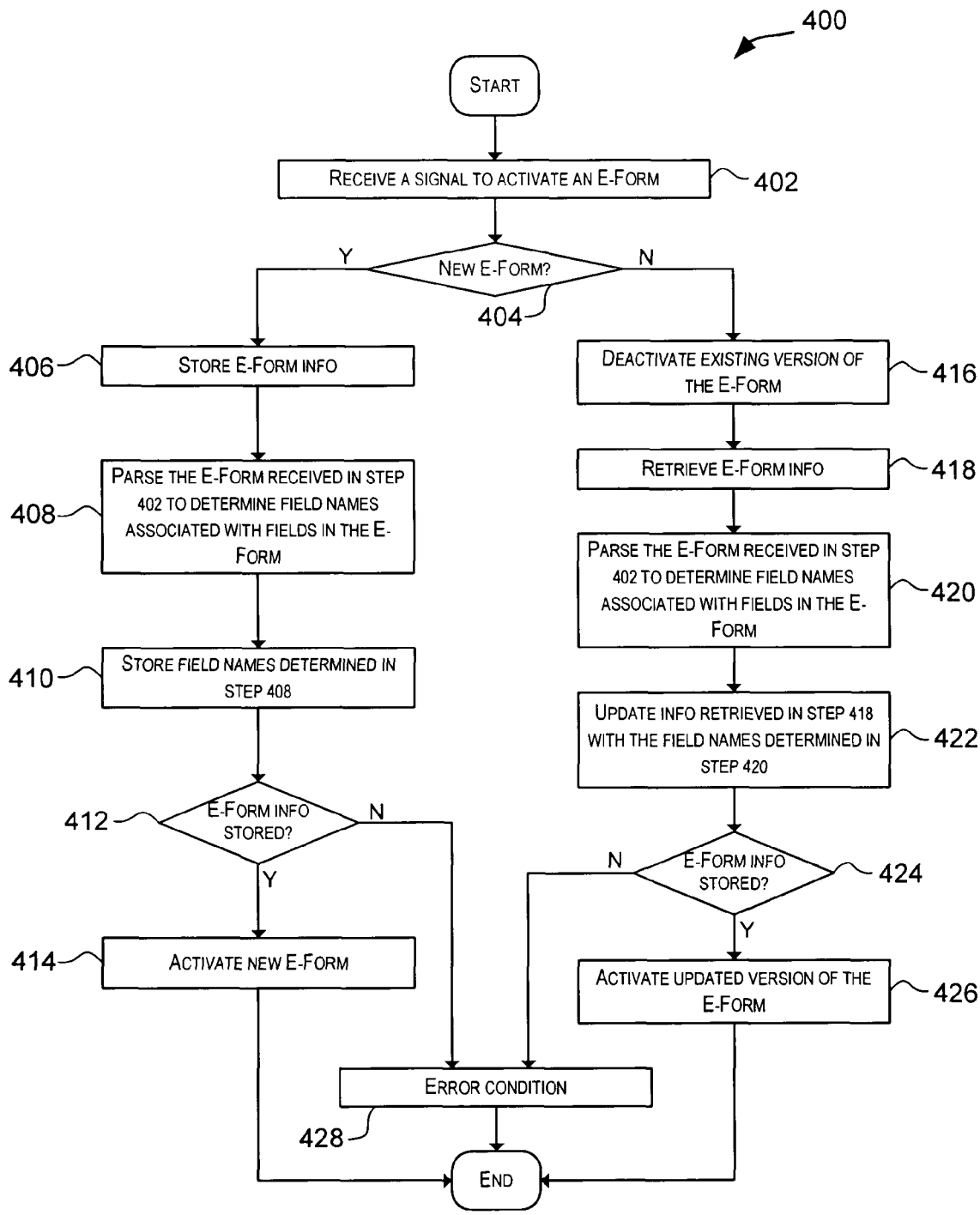
FIG. 4 is a simplified high-level flowchart depicting processing performed for activating an E-form according to an embodiment of the present invention.

FIG. 4 is a simplified high-level flowchart 400 depicting processing performed for activating an E-form according to an embodiment of the present invention. The processing depicted in FIG. 4 may be performed by software modules executed by a processor, hardware modules, or combinations thereof. In one embodiment, the processing is performed by application server 108. The processing depicted in FIG. 4 assumes that field names are used as field descriptors. Flowchart 400 depicted in FIG. 4 is merely illustrative of an embodiment of the present invention and is not intended to limit the scope of the present invention.

As depicted in FIG. 4, processing is initiated upon receiving a signal to activate an E-form (step 402). The E-form to be activated may be identified by an E-form name, identifier, version number, etc. The information received in step 402 may include a form template and images associated with the E-form.

The E-form received in step 402 to be activated may be a new form or an updated version of a previously activated E-form. Accordingly, a check is made to determine if the E-form to be activated is a new form or an updated form (step 404). If the E-form is determined to be a new form then processing continues with step 406 (insert operations) else processing continues with step 416 (update operations).

If a new E-form is to be activated, information related to the form such as template file, associated images, etc. is stored (step 406). The information may be stored in form library 120 or in database 110 that is accessible to application server 108. The template file for the E-form is then parsed to determine field names associated with the one or more fields in the E-form (step 408). The field names information is then stored for the E-form (step 410). A check is then made to see if the storage of the E-form and the field names was successful (step 412). If the storage was successful, then the new E-form is activated for use (step 414). An error message may be output if it is determined in step 412 that the storage of the new E-form was not successful (step 428).

If it is determined in step 404 that a new version of a previously activated E-form is to be activated, the existing activated version of the E-form is deactivated or its status changed to offline so that it cannot be used (step 416). Using information identifying the E-form received in step 402, stored information for the E-form is retrieved (step 418). The stored information may be retrieved from database 110 or from form library 120. The template file for the E-form is then parsed to identify field names associated with the one or more fields in the E-form (step 420). The stored information for the E-form retrieved in step 418 is then updated with the field names information for the updated form determined in step 420 (step 422). For example, if the updated E-form comprises new fields with new field names then those field names are added to the stored information. If field names have been changed, then that information is updated for the E-form. A check is then made to see if information for the E-form was successfully updated (step 424). If the update was successful, then the updated version of the E-form is activated for use (step 426). An error message may be output if the E-form information was not successfully updated (step 428).

Render or Display an E-Form

After an E-form has been activated, it is available for use by a user. A user using user system 104 may select an E-form to be filled. For example, a user using a browser running on a user system 104 may connect to a website provided by application server 108 and select an E-form to be filled out. An E-form may also be presented to the user during processing performed to consummate a transaction between a user using a user system and a provider. For example, an elderly person may wish to purchase insurance from a health care provider. In order to purchase the insurance, the elderly person may have to fill out several E-forms that may be presented to the elderly person as part of the transaction processing.

The process of displaying or rendering an E-form includes displaying the E-form and its associated images to the user. According to an embodiment of the present invention, information stored for a user prior to rendering the E-form may be used to populate or fill objects (e.g., fields) in the E-form when the E-form is rendered.

Figure 5:
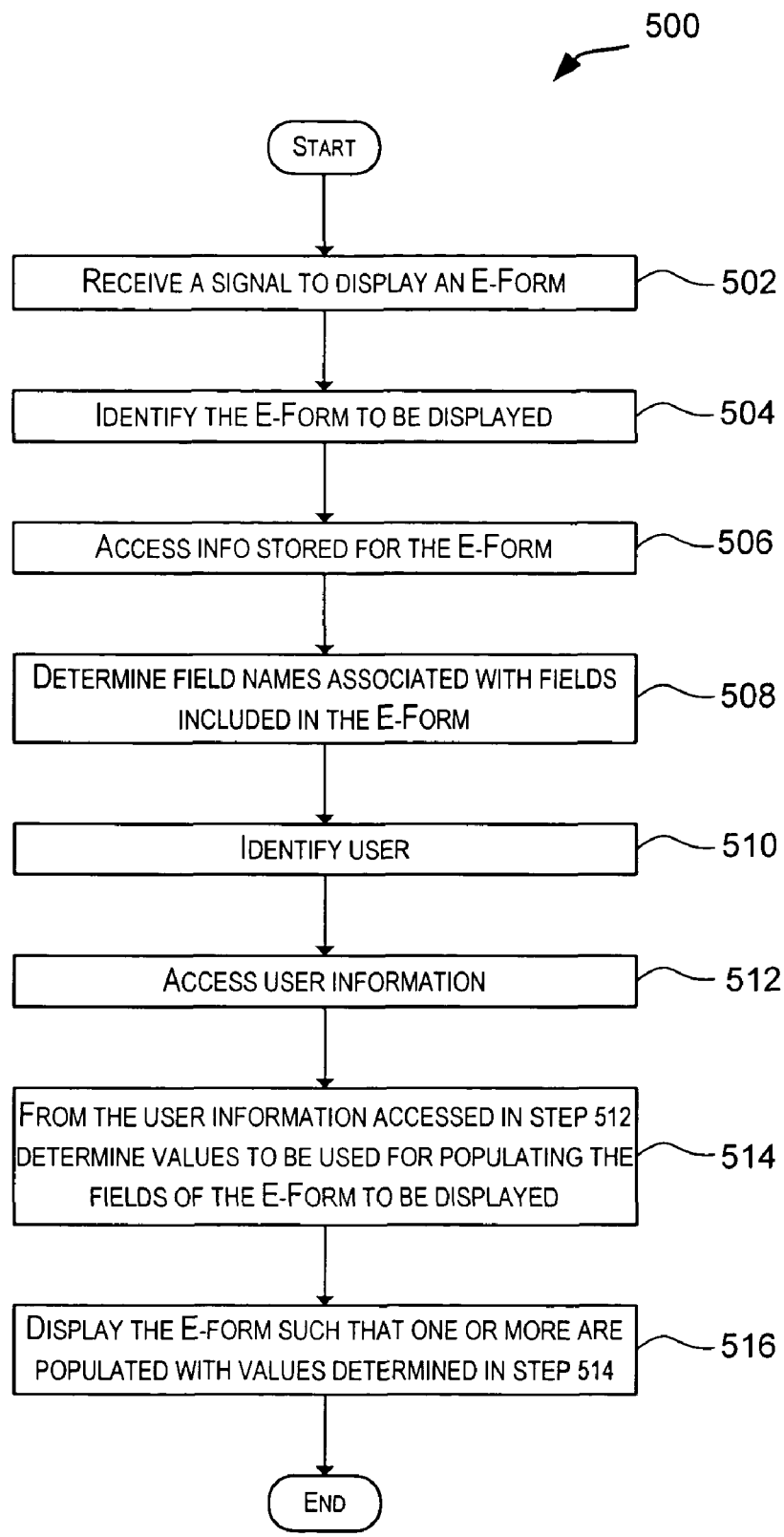
FIG. 5 is a simplified high-level flowchart depicting processing performed for displaying or rendering an E-form to a user according to an embodiment of the present invention.

FIG. 5 is a simplified high-level flowchart 500 depicting processing performed for displaying or rendering an E-form to a user according to an embodiment of the present invention. The processing depicted in FIG. 5 may be performed by software modules executed by a processor, hardware modules, or combinations thereof. In one embodiment, the processing is performed by application server 108. For purposes of describing the processing depicted in FIG. 5, it is assumed that field names associated with fields act as field descriptors. Flowchart 500 depicted in FIG. 5 is merely illustrative of an embodiment of the present invention and is not intended to limit the scope of the present invention.

As depicted in FIG. 5, processing is initiated upon receiving a signal to display an E-form (step 502). The signal in step 502 may be triggered in response to various stimuli. For example, the signal may be triggered and received when a user using an input device coupled to user system 104 selects an E-form. The signal may also be received when an E-form is to be displayed to the user as part of a transaction or other processing. In general, the signal is triggered whenever an E-form is to be presented to a user.

The E-form to be rendered/displayed is then identified (step 504). The E-form to be rendered may be identified based upon information received in step 502. Information that may be used to identify a form may include a form name, a form identifier, a form version, and the like. Information stored for the E-form identified in step 504 is then accessed (step 506). The information accessed in step 506 may include template files, images, and other information related to the E-form to be rendered. The information may be accessed from form library 120 or from database 110. A set of fields included in the E-form to be rendered and field names associated with the fields are then determined from the information accessed in step 506 (step 508).

The user who requested rendering of the E-form may also be identified (step 510). Various techniques may be used to identify the user. If the user has logged into the website provided by application server 108, then the login information may be used to identify the user. Techniques such as cookies and others known in the art may also be used to identify the user. In some embodiments, the user may provide information that is used to identify the user.

Information stored for the user identified in step 510 is then accessed (step 512). The user information may be accessed from database 110 or form archive 122. According to an embodiment of the present invention, for each user, the user information comprises information identifying a set of identifiers and values associated with the set of identifiers. Each identifier in the set of identifiers corresponds to a field descriptor that is associated with a field in an E-form. In one embodiment, the field descriptors themselves act as identifiers. For example, according to an embodiment, the set of identifiers comprises field names that are associated with fields of E-forms. The processing depicted in FIG. 5 and described below assumes that the set of identifiers comprises field names. Examples of identifiers (and their associated values) stored for a user include:

"FIRST_NAME" Tom
"LAST_NAME"=Smith
"AGE"=37
"ADDRESS"="1010 Wishful Drive, San Jose, Calif."

and the like.

The values associated with the identifiers for a user may have been set by the user or may have been set using automated techniques provided by the present invention. For example, in embodiments where field names are used as identifiers, the user may explicitly identify field names and values to be assigned to the field names. This may be done for example when the user provides profile information. In this embodiment, a list of field names may be displayed to the user and the user may set values for one or more of the field names. The list of field names displayed to the user may represent a union of field names used by the various E-forms. The field names and their associated values are stored as part of information stored for the user.

The identifiers and the values associated with the identifiers for a user may also be determined when a user fills out E-forms and archives or submits the E-forms. In these embodiments, assuming that field names serve as the identifiers, the field names associated with fields in an E-form submitted by a user and the values (information) entered in the fields are automatically detected. The field names along with their associated values are then stored as identifiers for the user. For example, when a user named Tom Smith enters his first name "Tom" in a first field of an E-form and his last name "Smith" in a second field of the E-form, the field names associated with the first field and the second field are determined. The value "Tom" is assigned to the first field name and the value "Smith" is associated with the second field name, and the field names along with their associated values are stored as part of the user information. Similar processing may be performed for the other fields in the E-form. The user information is automatically updated and supplemented as the user fills out more E-forms. More details related to automated archival of field names and associated values are described below.

Based upon the field names for the E-form determined in step 508 and the user information determined in step 512, values, if any, to be used for populating one or more fields in the E-form to be rendered are then determined (step 514). Assuming that that the field names serve as identifiers, as part of step 514, the user information is checked to see if it comprises any field names that are included in the set of field names determined in step 508 corresponding to the fields of the E-form to be rendered. For each such field name, the value, if any, associated with that field name (identifier) in the user information is determined and used to populate the field corresponding to the field name on the E-form.

The E-form is then rendered or displayed such that those fields with field names having values stored in the user information are populated with the corresponding values (step 516). The E-form may be displayed to the user on an output device of user system 104. In one embodiment, the values determined from the user information are converted to XML strings. An Adobe Form Server program is then used to render the E-form using the template file for the E-form and the associated images. The XML strings representing the values are then used to populate one or more fields of the E-form. Fields which do not have corresponding values in the user information are left blank.

In the embodiment described above, the field names themselves are stored as identifiers in the user information. In other embodiments, other types of identifiers, other than field names, may be used. In such embodiments, mapping information may be provided for determining identifiers in the user information corresponding to a particular field name associated with an E-form field. A 1-to-1, 1-to-many, many-to-1, or many-to-many relationship may exist between field names associated with fields on E-forms (i.e., identifiers associated with fields in E-forms) and identifiers (and associated values) stored for a user. For a particular field name associated with a field on an E-form, the mapping information may be used to determine an identifier corresponding to the particular field name stored in the user information. The value of information associated with the identifier may then be used to automatically populate fields of E-forms having the particular field name.

Automatically Archive E-Form Information

After an E-form has been displayed to a user, the user may fill in information in the fields of the E-form. The user may enter new information in fields of the E-form that are blank. The user can also change the information displayed in fields that are automatically populated when the E-form is rendered (as described above). After the user has completed filling in the form fields, the user may request that the E-form be submitted to an entity such as an insurance company, a health provider, or any other entity. According to an embodiment of the present invention, the information entered by the user on the E-form is automatically archived before the E-form is submitted to the appropriate entity.

Certain embodiments of the present invention also allow the user to archive the form information without submitting the form to any entity. In such an embodiment, an "Archive" button may be provided on the E-form that allows a user to archive E-form itself and the information entered on the E-form without submitting the E-form.

Figure 6:
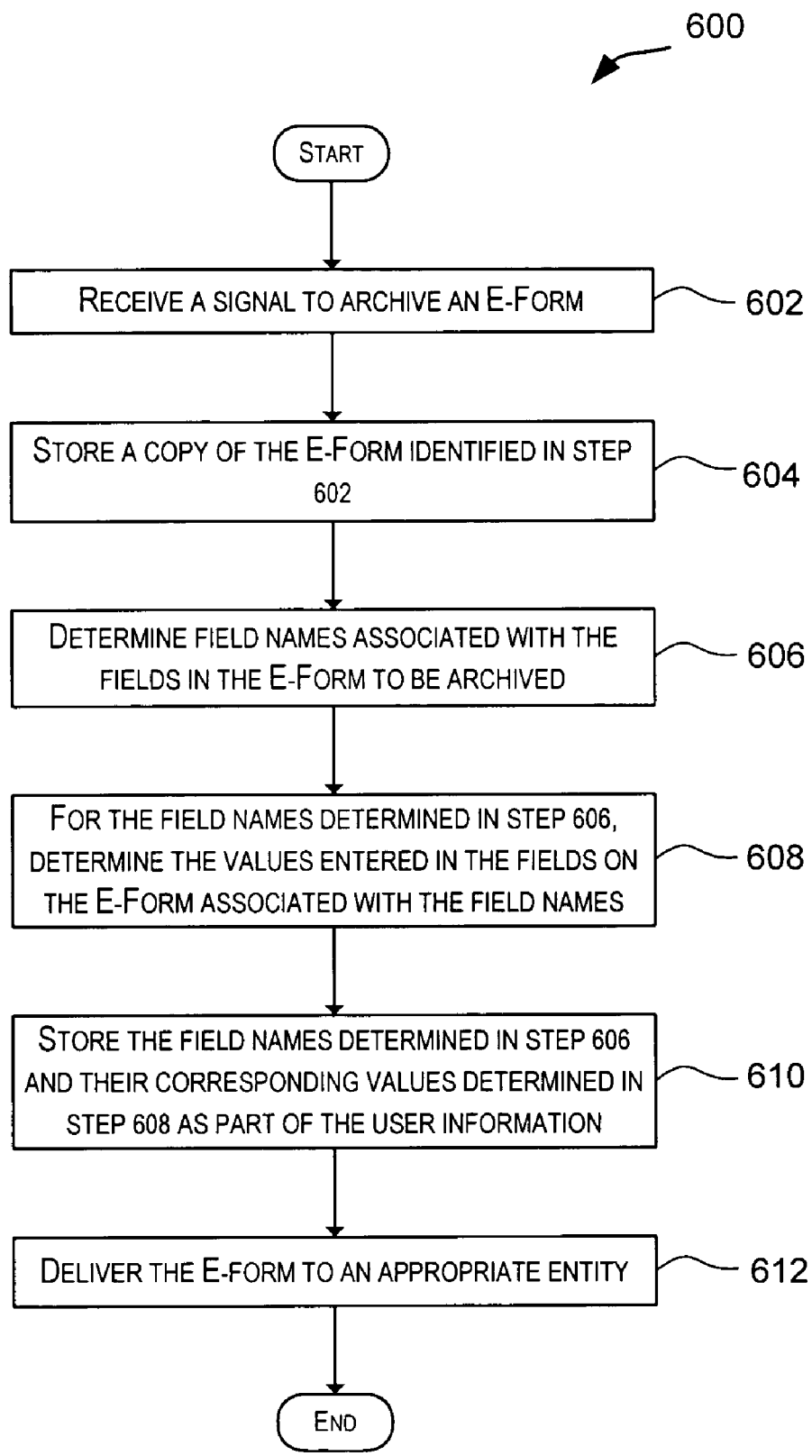
FIG. 6 is a simplified high-level flowchart depicting a method of archiving forms information according to an embodiment of the present invention.

FIG. 6 is a simplified high-level flowchart 600 depicting a method of archiving forms information according to an embodiment of the present invention. The processing depicted in FIG. 6 may be performed by software modules executed by a processor, hardware modules, or combinations thereof. In one embodiment, the method is performed by application server 108. The flowchart depicted in FIG. 6 assumes that the field names serve as identifiers that are stored for a user. Flowchart 600 depicted in FIG. 6 is merely illustrative of an embodiment of the present invention and is not intended to limit the scope of the present invention.

As depicted in FIG. 6, processing is initiated upon receiving a signal requesting that information be archived for an E-form (step 602). The signal may be received responsive to the user requesting the E-form be submitted to a provider. The signal may also be received responsive to the user requesting the E-form to be archived.

A copy of the E-form identified in step 602 is then stored (step 604). The information in step 604 may be stored as part of user information for a user. As described below in further detail, the stored information can be used to display submitted E-forms to a user. In certain embodiments, the entire E-form, or a portion thereof, may be stored in a user-specified location. The user-specified location may be on a removable or portable medium, on a computer, on a system coupled to user system 104, on a PDA or cell phone, and the like.

Field names associated with the fields included in the E-form are then determined (step 606). For the field names determined in step 606, determine the values (information) entered in the fields associated with the field names (step 608). In step 608, for each field in the E-form, the information or value entered in the field is determined and the value is associated with the field name associated with the field.

The field names and their corresponding values (i.e., information entered in fields associated with the field names) are then stored for the user (step 610). The field names and their corresponding values may be stored as part of user information for the user. As described above, the user information may already include a set of field names (identifiers) and values associated with the field names. If a field name to be stored in step 608 already exists in the user information, then the value associated with that field name is updated to the value determined for the field name in step 608. This is to ensure that the latest value is stored for a field name. If the field name does not already exist in the user information, then that field name and its associated value is added to the user information. In this manner, information related to new field names and their associated values are automatically stored as part of the user information. The user information is automatically supplemented with new field names and values with every E-form submitted or archived by a user. In one embodiment, the field names and their associated values may be stored in a XML structure like the XML structure shown below. Other formats may also be used for storing the information.

If the user has requested submission of the E-Form to an entity (e.g., a provider), then the E-form may then be delivered to the appropriate entity (step 612). The E-form may be delivered in various formats such as an image, a XML data structure, a PDF document, and the like. Various delivery channels may be used to deliver the E-form such as Email, file attachment, facsimile, etc. For example, an email comprising a XML data file as an attachment may be delivered to a provider. If the data is to be delivered in PDF format, an embodiment of the present invention may create a PDF file based upon the E-forms information (and possibly using the services of an Adobe Form Server) and deliver the PDF file to the appropriate entity. Step 612 may not be performed if the user has merely requested that the E-form be archived.

EXAMPLE

Figure 7:
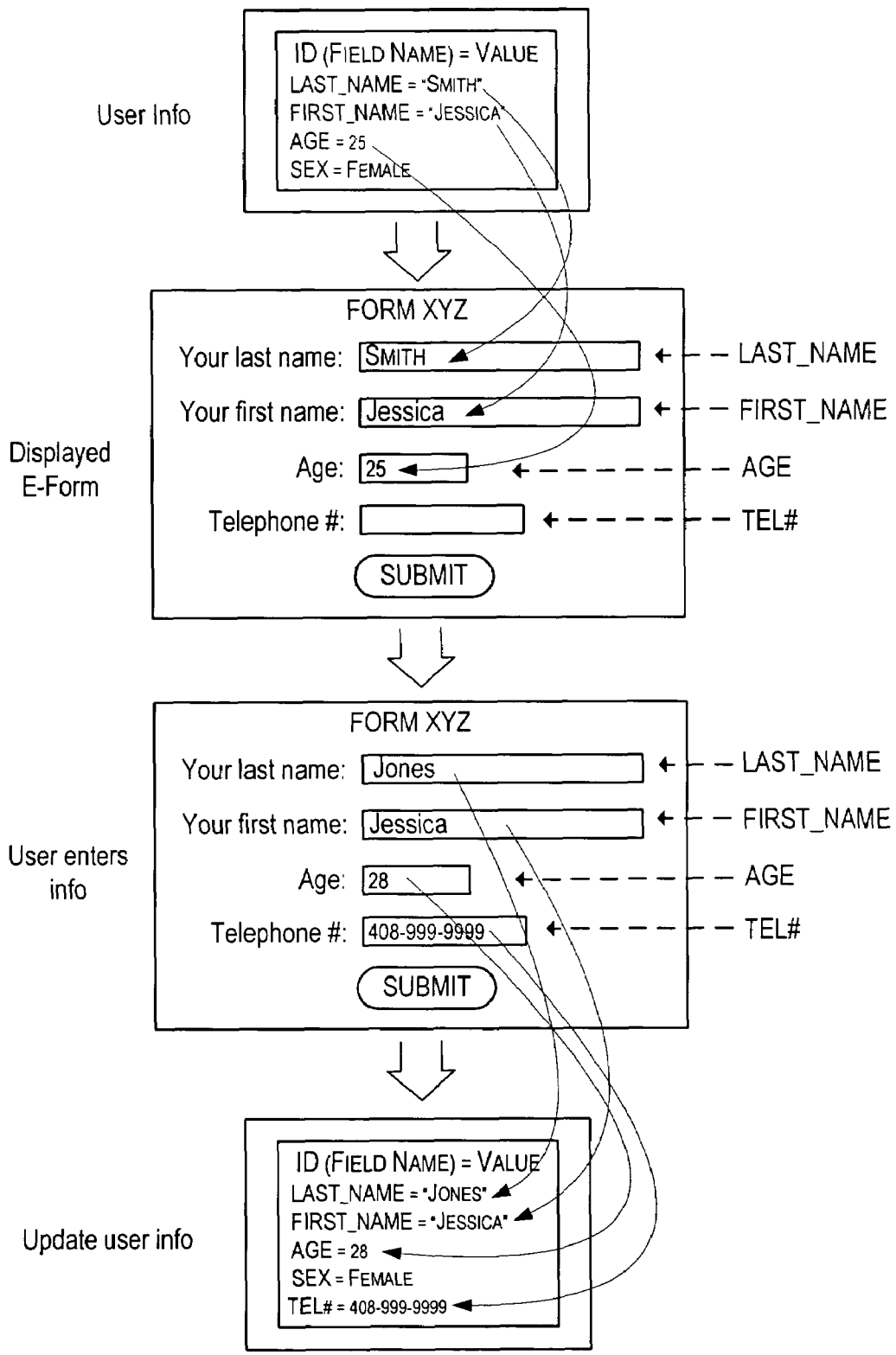
FIG. 7 depicts an example that illustrates the manner in which an E-form is automatically populated and archived according to an embodiment of the present invention.

FIG. 7 depicts an example that illustrates the manner in which an E-form is automatically populated and archived according to an embodiment of the present invention. Let's assume that the user information for a user Jessica Smith comprises four identifiers (field names serve as identifiers) and their associated values. As shown in FIG. 7, the field names and their associated values include: LAST_NAME=Smith; FIRST_NAME=Jessica; AGE=25; SEX=Female.

Now let's assume that Jessica selects an E-form "XYZ". When form XYZ is to be displayed to Jessica, processing is performed according to flowchart 500 depicted in FIG. 5. As part of the processing, the fields included in the E-form and their associated field names are determined. As shown in FIG. 7, form XYZ comprises four fields and the field names associated with the fields are "LAST_NAME", "FIRST_NAME", "AGE", and "TEL#". As part of the processing to display form XYZ, Jessica's user information is searched to determine is it includes values for field names associated with fields in form XYZ. Since the user information for Jessica stores field names "LAST_NAME", "FIRST_NAME" and "AGE", the values associated with those field names in the user information are used to populate the corresponding fields when form XYZ is displayed to Jessica. Accordingly, when form XYZ is displayed to Jessica, fields associated with field names "LAST_NAME", "FIRST_NAME", and "AGE" are pre-filled with the values "Smith", "Jessica" and "25, as shown in FIG. 7. The field associated with field name "TEL#" is left blank.

Jessica may then enter and/or change information on E-form XYZ. As shown in FIG. 7, Jessica has changed the information in the field associated with field name "LAST_NAME" from "Smith" to "Jones" since her last name has changed since she got married. She has also changed her age information from 25 to 28. She has also entered her telephone number in the field associated with field name "TEL#". Jessica then decides to submit that E-form by selecting the "SUBMIT" button.

Upon selecting the "Submit" button, the form information is archived according to an embodiment of the present invention using the method described in FIG. 6. The values in user information for Jessica are updated based upon values from E-form XYZ. Previous values for field names "LAST_NAME" and "AGE" are overwritten with new values. The field name "TEL#", which was not previously stored in the user information, is automatically added to the user information along with its corresponding value. The updated and new user information can be used for filling E-forms in the future.

Displaying and Tracking Forms

As previously described, application server 108 may be configured to archive forms that are submitted or archived by a user. An E-form is considered as submitted when a signal is received to deliver the E-form to an entity such as a particular provider. In addition to storing a copy of submitted E-forms, application server 108 may also be configured to track the status of the submitted forms according to an embodiment of the present invention. For example, application server 108 can track whether a submitted E-form was accepted by the entity to which the form was submitted, whether the E-form was rejected, whether the form was processed, and the like.

Various techniques may be used to track the status of submitted E-forms. In one embodiment, application server 108 receives status information for a submitted E-form from provider systems to which the E-form was delivered. For example, a user may log onto application server 108, select an E-form from a particular provider, fill out the E-form, and request the E-form be delivered to the particular provider. Upon delivering the E-form to the particular provider, application server 108 may receive updates from the particular provider regarding the status of the submitted E-form. These status updates are stored by application server 108 for the particular user and can be subsequently viewed by the user.

In other embodiments, application server 108 may be configured to poll providers (e.g., poll provider systems 106) for status updates related to E-forms submitted to the providers by a user. The E-form status information received by application server 108 from the providers is stored and can be subsequently viewed by the user.

Figure 8:
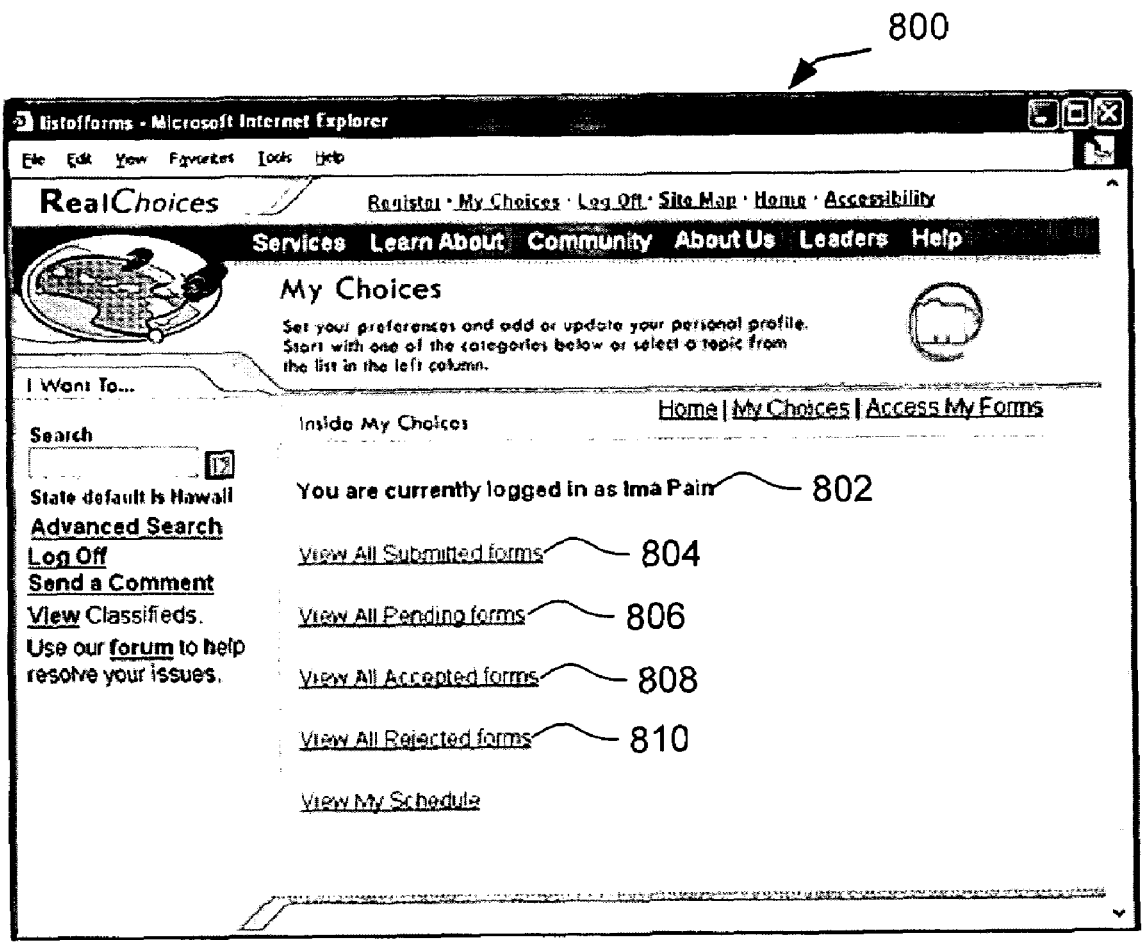
FIG. 8 depicts a simplified GUI for viewing E-forms information according to an embodiment of the present invention.

Various graphical user interfaces (GUIs) are provided for viewing information related to E-forms that are submitted or archived by a user using application server 108. FIG. 8 depicts a simplified GUI 800 for viewing E-forms information according to an embodiment of the present invention. As shown in FIG. 8, information 802 is displayed in the GUI identifying the user (Ima Pain). Various options are provided for viewing information about E-forms for a user. A URL link 804 is provided for viewing information related to E-forms submitted by the user Ima Pain. Upon selecting link 804, a GUI is displayed showing information related to E-forms submitted by the user. A link 806 is provided for viewing information related to E-forms that have been submitted and whose status is "pending". A link 808 is provided for viewing information related to E-forms that have been submitted and that have been "accepted". A link 810 is provided for viewing information related to E-forms that have been submitted and that have been "rejected". The semantics or meaning associated with statuses "pending, "accepted", "rejected", etc. for a particular E-form may be dependent on the E-form and may be assigned by the entity to which the E-form is submitted or by the provider of application server 108.

Figure 9:
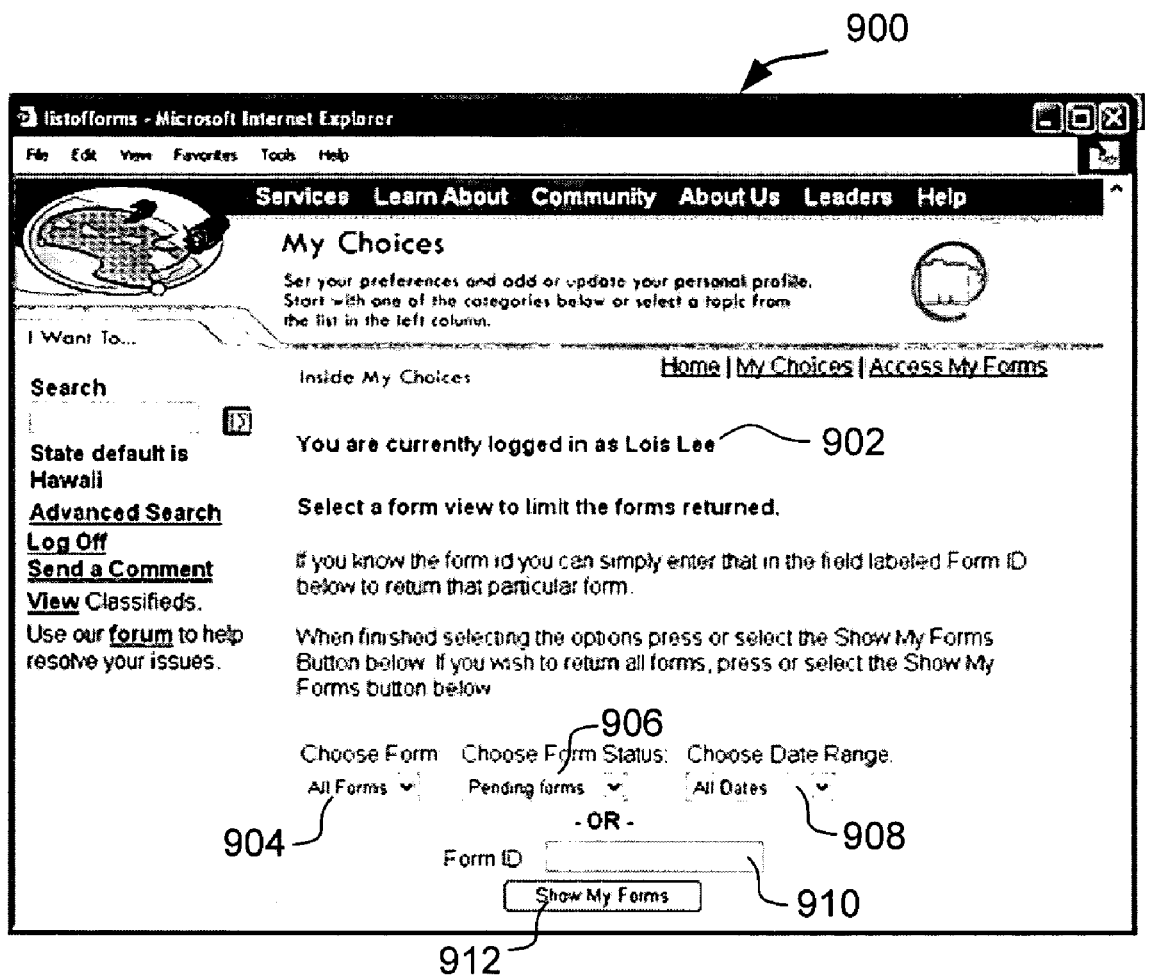
FIG. 9 depicts another simplified GUI for viewing E-forms information according to an embodiment of the present invention.

FIG. 9 depicts another simplified GUI 900 for viewing E-forms information according to an embodiment of the present invention. As shown in FIG. 9, information 902 identifying the currently logged in user (Lois Lee) is displayed. The user can specify criteria to be used for searching and displaying submitted E-forms using menu lists 904, 906, and 908. The set of E-forms to be searched can be specified using menu list 904. The user can chose submitted E-forms having a particular status (e.g., pending, accepted, etc.) associated with them using menu list 906. The user can also chose the date range for the E-forms to be displayed using list 908. The user may also select a particular E-form to be displayed by providing the form identification information in field 910. Upon selecting button 912, only those E-forms that meet the criteria specified by the user are displayed.

Figure 10:
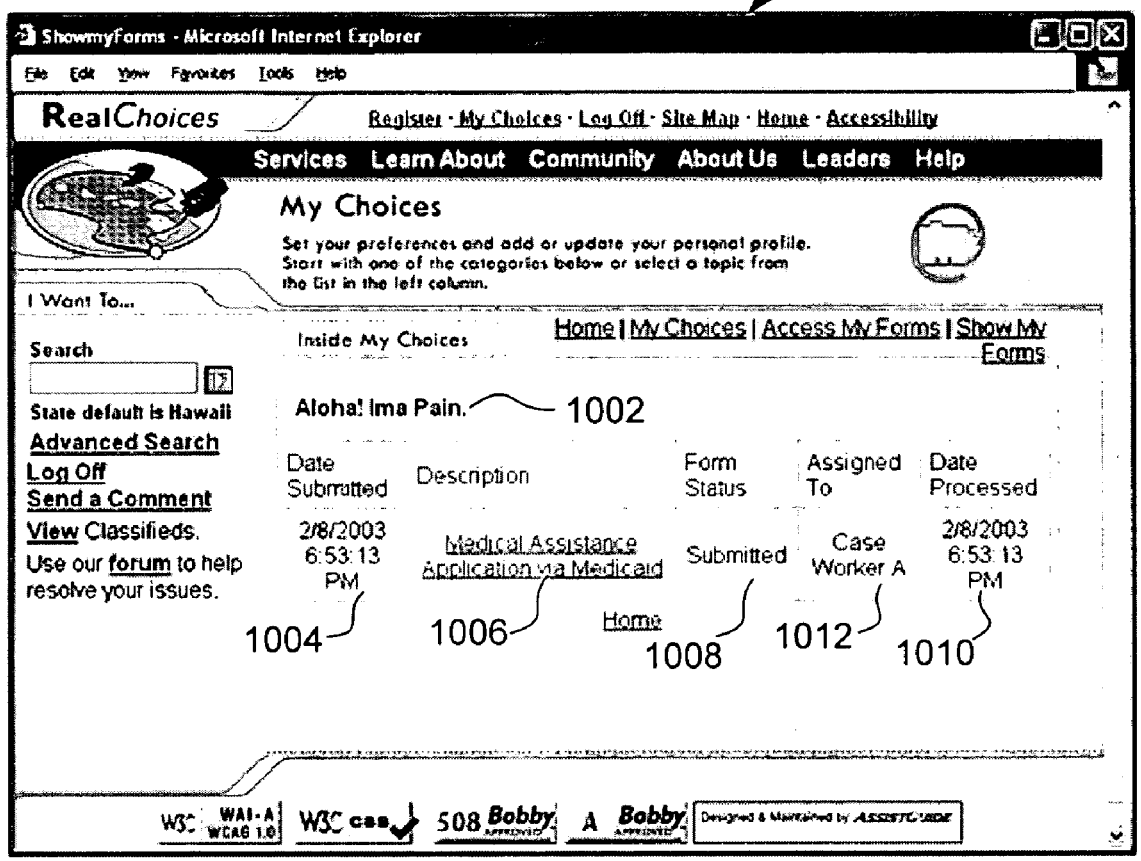
FIG. 10 depicts a simplified GUI displaying information related to submitted E-forms according to an embodiment of the present invention.

FIG. 10 depicts a simplified GUI 1000 displaying information related to E-forms that have been submitted according to an embodiment of the present invention. Information 1002 identifying the user that submitted the E-form is displayed. As shown in FIG. 10, one E-form has been submitted by user Ima Pain. The date and time 1004 when the E-form was submitted is displayed. Information 1006 identifying/describing the submitted E-form is displayed. Information 1006 itself is a link to a stored representation (e.g., an image) of the E-form that was submitted. An image of the submitted E-form is displayed to the user upon selecting information link 1006. The image may be used as a template (or starting point) for submitting another E-form. The information from the E-form image may be imported into another form. The status 1008 of the submitted E-form is displayed. The date and time 1010 when the E-form was processed by the provider receiving the E-form and information 1012 identifying a case worker to whom the E-form was assigned for processing is also displayed. Other types of information may also be displayed in other embodiments of the present invention.

Figure 11:
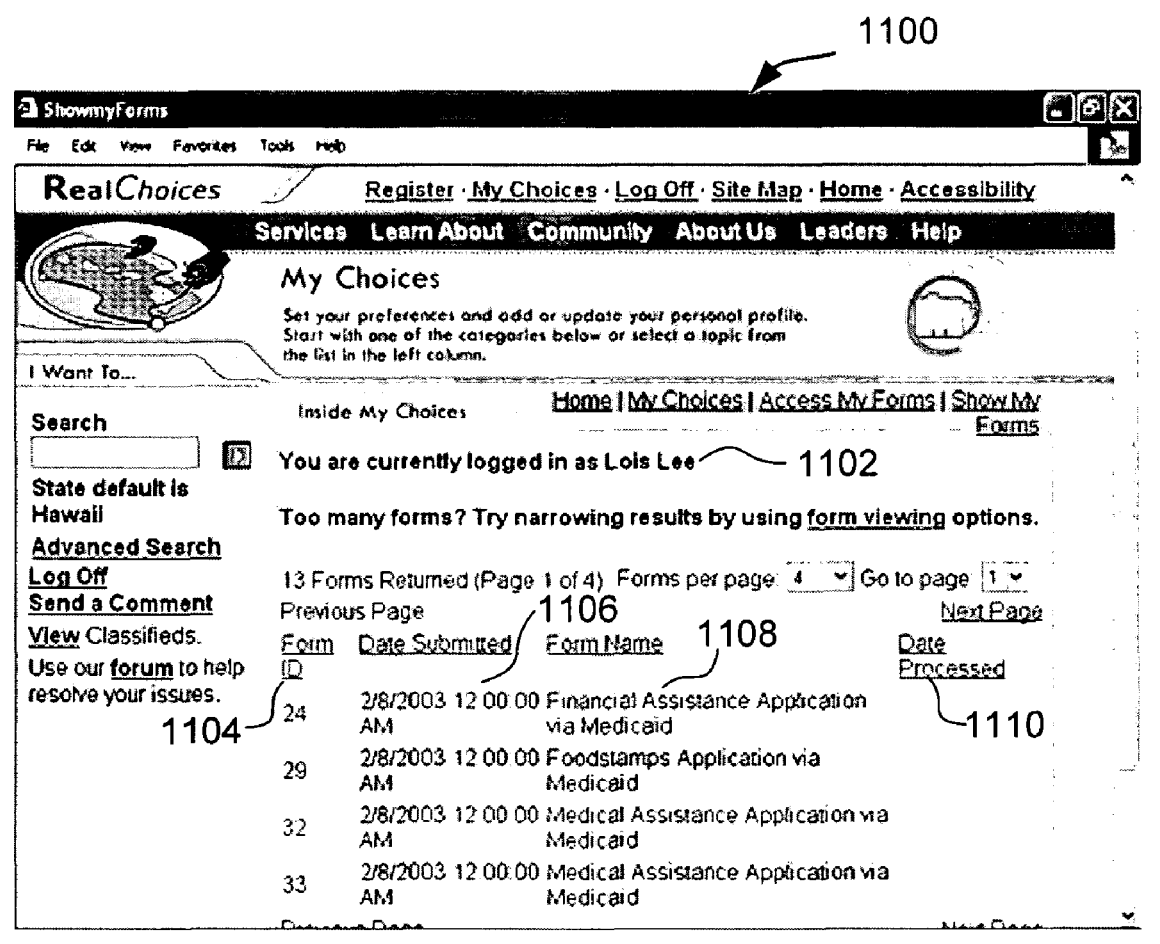

FIG. 11 depicts another simplified GUI 1100 displaying information related to E-forms according to an embodiment of the present invention. As shown in FIG. 11, information for multiple E-forms is displayed. Information displayed for each E-form includes a form identifier 1102 for the E-form, the date and time 1104 when the E-form was submitted, a name 1106 of the E-form, and a date 1108 when the E-form was processed.

Sample Database Schema

Figure 12A:
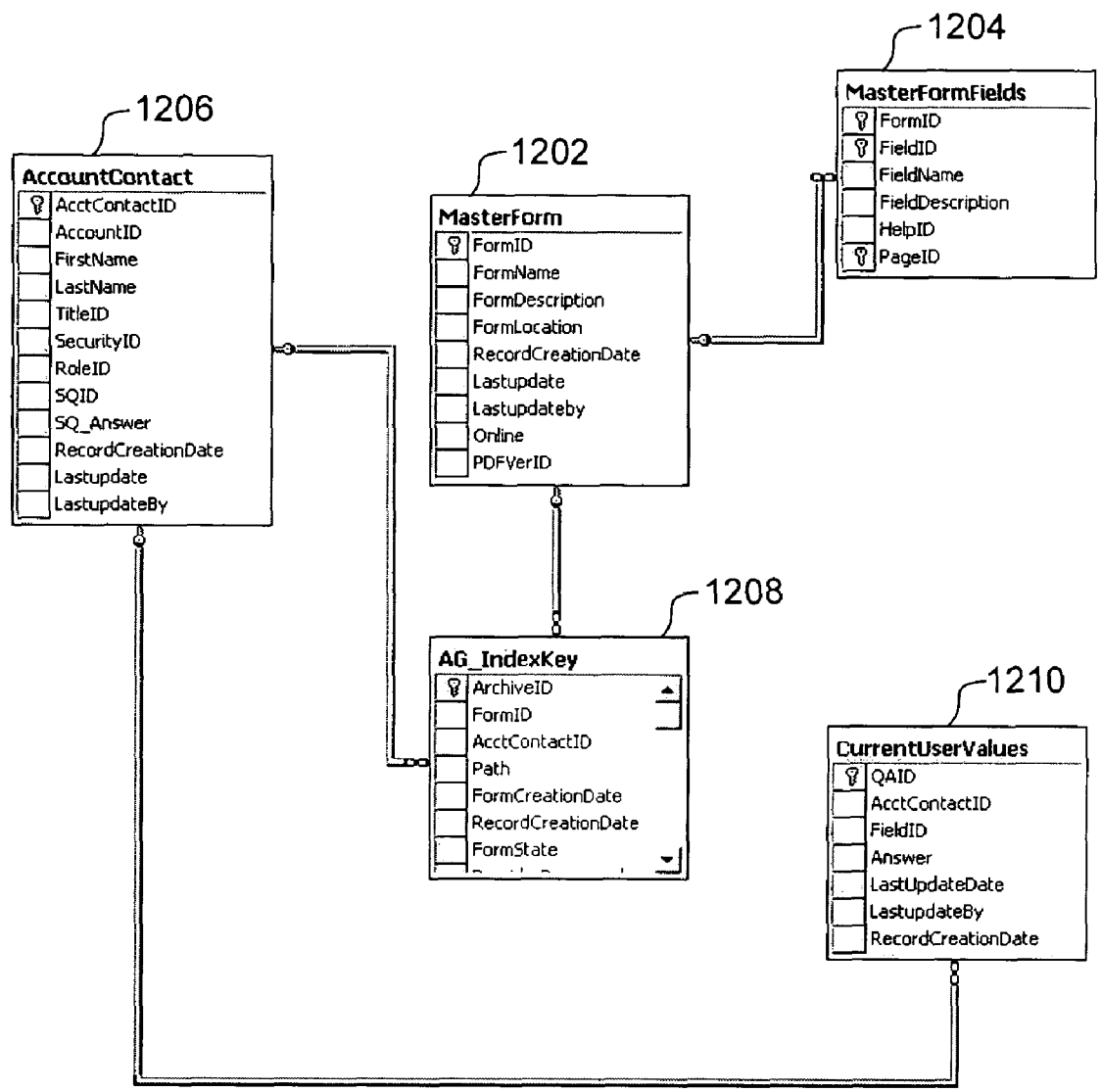
FIGS. 12A and 12B depict a database schema for storing information according to an embodiment of the present invention.
Figure 12B:
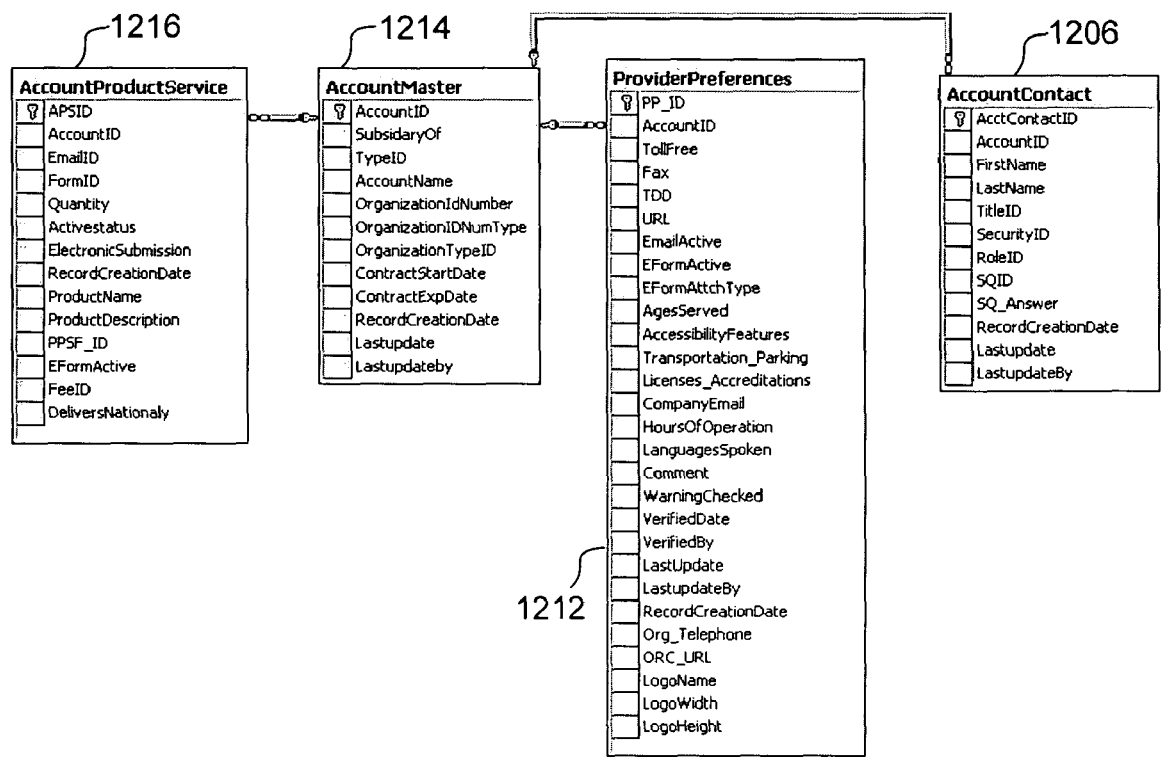

As described above, various types of information may be stored to facilitate processing of E-forms. The information may be stored in different forms including files, databases, data structures, or other memory structures. FIGS. 12A and 12B depict a database schema for storing information according to an embodiment of the present invention. It should be apparent that the schemas depicted in FIGS. 12A and 12B are not intended to limit the scope of the present invention as recited in the claims.

As depicted in FIG. 12A, table MasterForm 1202 stores information for the various E-forms such as form name, form id, location where the E-form is stored, date of creation of the E-form, the last update date, and other information. For each E-form, table MasterFormFields 1204 stores information regarding fields in the E-form such as the field id, field name associated with each field, field description, etc. Table AccountContact 1206 stores information for each user account. The stored information may include the user's first name, last name, account id, etc. Table AG_IndexKey 1208 stores information identifying E-forms that a user has submitted or archived. Table CurrentUserValues 1210 stores information identifying a set of identifiers and associated values stored for a user.

As depicted in FIG. 12B, table AccountMaster 1214 stores information about the status of each provider authorized to use the system, such as the name of the account, relation to other accounts (i.e. subsidiary, etc.), and date of contract. Table ProviderPreferences 1212 stores more specific information about each provider, such as contact information, facilities, capabilities, and so forth that a user may want to know. Table AccountProductService 1216 stores information about each product or service that a provider may offer through the system, including name, description, status, and associated E-form id, if any.

Sample XML Structure

As described above, the E-form information for a user may be stored in various forms. In one embodiment, the information may be stored as an XML structure as shown below. The information may also be stored in various other forms.

```
<?xml version="1.0" standalone="yes" ?>
    <?xfa generator="FF99V250_01"?>
- <jfxpf:XPF xmlns:jfxpf="http://www.xfa.com/schema/xml-package">
- <jfxpf:Package>
- <jfxpf:Resource Location="DHS1100ver5a">
    <jfxpf:Link ContentType="application/x-jetform-cft" />
    </jfxpf:Resource>
- <jfxpf:Resource Location="default.xml">
-       <jfxpf:Content     ContentType="text/xml" Location="default.xml">
- <xfa:Data xmlns:xfa="http://www.xfa.com/schema/xfa-data">
- <xfa:DataGroup>
- <DHS1100ver5a>
    <?jetform ^Dat ^page Intro?>
    <?jetform ^Dat ^page Step1?>
    <Last_Name>Kaphin</Last_Name>
    <First_Name>Thomas</First_Name>
    <Middle_Initial>J</Middle_Initial>
    <Home_Address>30475 Ala Puha Place</Home_Address>
    <Apartment_Number />
    <City />
    <State_Abbr>HI</State_Abbr>
    <Zip_Code />
    <Mailing_Address />
    <Day_Telephone>18885551212</Day_Telephone>
    <Email_Address>aaaaaaa@hotmail.com</Email_Address>
    <?jetform ^Dat ^page Step2?>
    <Med_Assist_Preg_Yes>0</Med_Assist_Preg_Yes>
    <Med_Assist_Preg_No>-1</Med_Assist_Preg_No>
    . . .
    <Ongoing_Medical_No_B>0</Ongoing_Medical_No_B>
    <?jetform ^Dat ^page Close?>
    <TMP_CloseAction1>-1</TMP_CloseAction1>
    <TMP_CloseAction2>0</TMP_CloseAction2>
    <TMP_CloseAction3>0</TMP_CloseAction3>
    <?jetform ^Dat ^page Step9n10?>
    <TMP_FID>114</TMP_FID>
    <TMP_AID>379</TMP_AID>
    </DHS1100ver5a>
    </xfa:DataGroup>
    </xfa:Data>
    </jfxpf:Content>
    </jfxpf:Resource>
    </jfxpf:Package>
    </jfxpf:XPF>
```

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. It should be understood that the equations described above are only illustrative of an embodiment of the present invention and can vary in alternative embodiments of the present invention.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method of processing electronic forms, the method comprising:
    receiving information identifying a first electronic form, said received;
    determining a set of descriptors associated with a set of fields included in the first electronic form, the set of descriptors including a first descriptor associated with a first field, wherein the set of descriptors associated with the set of fields included in the first electronic form includes field names associated with the set of fields and the set of identifiers stored for the user comprises one or more field names associated with the set of fields;
    accessing user information from a computer memory, said user information comprising information identifying a set of identifiers stored for a user, the set of identifiers stored for the user including a first identifier corresponding to the first descriptor, wherein a first value is associated with the first identifier, displaying the first electronic form on a computer display such that the first value is displayed in the first field of the first electronic form;

identifying at least a second descriptor associated with a field in the first electronic form that does not have a corresponding identifier in the set of identifiers stored for the user;

determining a second value entered in the field associated with the second descriptor;

automatically updating the set of descriptors whereby an identifier corresponding to the second descriptor is included in the set of identifiers stored for the user and the second value is associated with the identifier corresponding to the second descriptor;

determining a third value entered in the first field of the first electronic form that is different from the first value; and automatically updating the user information such that the third value is associated with the first identifier.

2. The method of claim 1 further comprising:

receiving information identifying a second electronic form;

determining a set of descriptors associated with a set of fields included in the second electronic form, the set of descriptors including the second descriptor;

and displaying the second electronic form on a computer display such that the second value is displayed in the field of the second electronic form associated with the second descriptor.

3. A computer program product stored on a computer-readable medium for controlling a processor to process electronic forms, the computer program product comprising:

code for receiving information identifying a first electronic form; code for determining a set of descriptors associated with a set of fields included in the first electronic form, the set of descriptors including a first descriptor associated with a first field, wherein the set of descriptors associated with the set of fields included in the first electronic form includes field names associated with the set of fields and the set of identifiers stored for the user comprises one or more field names associated with the set of fields;

code for accessing user information comprising information identifying a set of identifiers stored for a user, the set of identifiers stored for the user including a first identifier corresponding to the first descriptor, wherein a first value is associated with the first identifier;

code for displaying the first electronic form on a computer display such that the first value is displayed in the first field of the first electronic form;

code for identifying at least a second descriptor associated with a field in the first electronic form that does not have a corresponding identifier in the set of identifiers stored for the user;

code for determining a second value entered in the field associated with the second descriptor;

code for automatically updating the set of descriptors whereby an identifier corresponding to the second descriptor is included in the set of identifiers stored for the user and the second value is associated with the identifier corresponding to the second descriptor;

code for determining a third value entered in the first field of the first electronic form that is different from the first value; and code for automatically updating the user information such that the third value is associated with the first identifier.

4. The computer program product of claim 3 further comprising:

code for receiving information identifying a second electronic form;

code for determining a set of descriptors associated with a set of fields included in the second electronic form, the set of descriptors including the second descriptor; and code for displaying the second electronic form on a computer display such that the second value is displayed in the field of the second electronic form associated with the second descriptor.

5. A system comprising:

a memory storing user information, the user information comprising information identifying a set of identifiers stored for a user, the set of identifiers stored for the user including a first identifier corresponding to a first descriptor, wherein a first value is associated with the first identifier; and a processor coupled to the memory;

wherein the processor is configured to:

receive information identifying a first electronic form;

determine a set of descriptors associated with a set of fields included in the first electronic form, the set of descriptors including a the first descriptor associated with a first field, wherein the set of descriptors associated with the set of fields included in the first electronic form includes field names associated with the set of fields and the set of identifiers stored for the user comprises one or more field names associated with the set of fields;

cause the first electronic form to be displayed such that the first value is displayed in the first field of the first electronic form;

identify at least a second descriptor associated with a field in the first electronic form that does not have a corresponding identifier in the set of identifiers stored for the user;

determine a second value entered in the field associated with the second descriptor;

automatically update the set of descriptors whereby an identifier corresponding to the second descriptor is included in the set of identifiers stored for the user and the second value is associated with the identifier corresponding to the second descriptor;

determine a third value entered in the first field of the first electronic form that is different from the first value; and automatically update the user information such that the third value is associated with the first identifier.

6. The system of claim 5 wherein the processor is further configured to:

receive information identifying a second electronic form;

determine a set of descriptors associated with a set of fields included in the second electronic form, the set of descriptors including the second descriptor; and cause the second electronic form to be displayed such that the second value is displayed in the field of the second electronic form associated with the second descriptor.

* * * * *